United States Patent [19]
Vaishnav et al.

[11] Patent Number: 5,971,461
[45] Date of Patent: Oct. 26, 1999

[54] AUTOMOTIVE VEHICLE INSTRUMENT PANEL ASSEMBLY WITH MODULAR GLOVEBOX

[75] Inventors: Dhaval Nalinkant Vaishnav, Canton; John Russell Pate, Eastpoint; Jerry G. Yatros, Romeo, all of Mich.

[73] Assignee: Ford Motor Company, Dearborn, Mich.

[21] Appl. No.: 08/870,051

[22] Filed: Jun. 5, 1997

[51] Int. Cl.$^6$ .................................................. B60N 3/12
[52] U.S. Cl. .......................................... 296/37.12; 296/72
[58] Field of Search ................................ 296/37.1, 37.8, 296/37.12, 192, 194, 72; 312/321.5, 328; 220/528

[56] References Cited

U.S. PATENT DOCUMENTS

| | | |
|---|---|---|
| 2,789,861 | 4/1957 | Hudson . |
| 3,386,765 | 6/1968 | Drach, Jr. . |
| 3,704,926 | 12/1972 | Wariner ................................. 296/37.1 |
| 4,596,416 | 6/1986 | Muller .................................. 296/37.12 |
| 4,663,803 | 5/1987 | Gora . |
| 4,886,311 | 12/1989 | Trube et al. ......................... 296/37.12 |
| 4,919,150 | 4/1990 | Grant . |
| 5,190,314 | 3/1993 | Takasugi ........................... 296/37.12 X |
| 5,197,775 | 3/1993 | Reeber . |
| 5,273,310 | 12/1993 | Terai ..................................... 296/70 X |
| 5,516,177 | 5/1996 | Levely . |
| 5,685,595 | 11/1997 | Nishijima et al. ........................ 296/70 |
| 5,685,598 | 11/1997 | Inoue et al. ............................ 296/70 X |
| 5,707,100 | 1/1998 | Suyama et al. ......................... 296/192 |
| 5,785,598 | 11/1997 | Inoue et al. . |

FOREIGN PATENT DOCUMENTS

| | | |
|---|---|---|
| 0 073 431 | 8/1982 | European Pat. Off. . |
| 848 015 | 6/1952 | Germany . |
| 39 30073 A1 | 3/1991 | Germany . |
| 195 05 985 A1 | 8/1996 | Germany . |
| 61-157452 | 7/1986 | Japan . |
| 5-4549 | 1/1993 | Japan . |
| 5-85270 | 4/1993 | Japan . |
| 406156149 | 6/1994 | Japan ................................. 296/37.12 |
| 6-156149 | 6/1994 | Japan . |

*Primary Examiner*—D. Glenn Dayoan
*Assistant Examiner*—Chad D. Wells
*Attorney, Agent, or Firm*—David B. Kelley

[57] ABSTRACT

An instrument panel assembly for an automotive vehicle provides connection between an instrument panel and a glovebox so that the glovebox has a separate mating reference between moving parts independent of the instrument panel. The instrument panel is mounted to a cross-car beam in the vehicle and has a glovebox opening with a frame mating surface therearound. The glovebox has a frame and a door. The frame is attached adjacent the frame mating surface, and has a first integrally formed half-hinge. The door, which pivots to alternately cover and uncover the glovebox opening, has a second integrally formed half-hinge. The frame and the door are connected at the respective half-hinges to provide a mating reference therebetween independent of the instrument panel.

9 Claims, 8 Drawing Sheets

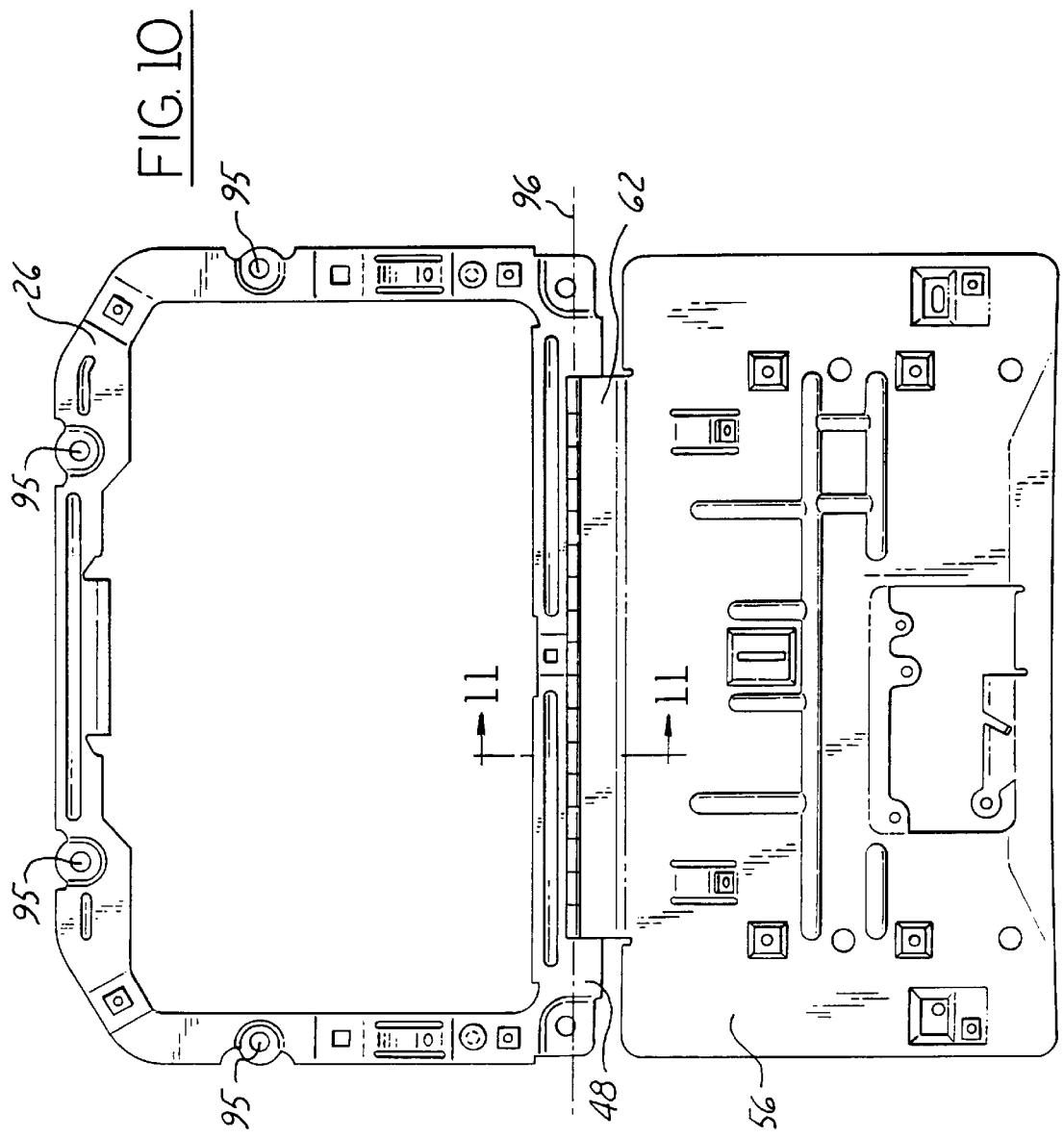

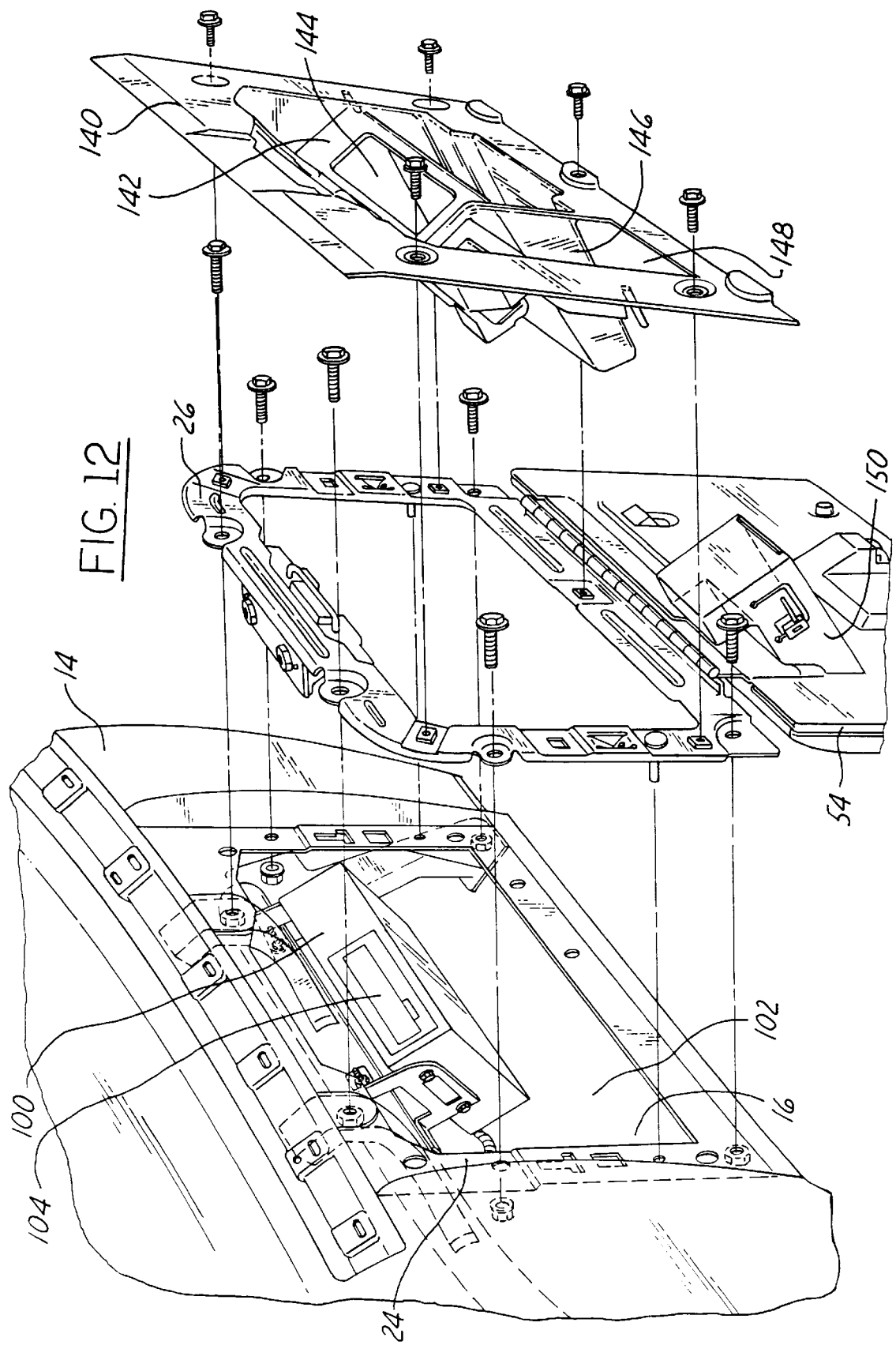

AUTOMOTIVE VEHICLE INSTRUMENT PANEL ASSEMBLY WITH MODULAR GLOVEBOX

FIELD OF THE INVENTION

The present invention relates to automotive instrument panel assemblies in general, and more specifically to an instrument panel assembly with a modular glovebox.

BACKGROUND OF THE INVENTION

In conventional instrument panel designs, a glovebox door alternately covers and uncovers an opening through an instrument panel, in which can be a fixed bin or a pivoting bin, to provide a storage space for various items. A striker bar for latching the glovebox door in a closed position is typically fixed to the instrument panel, and a latch mechanism is attached to an instrument panel facing surface of the door. A piano type hinge typically connects the door to the instrument panel, each half of the hinge having separate connections. Since the glovebox door, and the latch mechanism affixed thereto, are fixed to the instrument panel independently from the striker bar and from each other, there is a considerable amount of variation in the relative positions of the latch and the striker bar. This variation directly affects the effort required to open or close the glovebox door. Adjustments to the striker bar are then required to control the latch opening and closing efforts. These adjustments, in turn, affect glovebox fit and finish to the instrument panel. In short, conventional glovebox designs couple latch efforts with glovebox door fit and finish so that corrective adjustments for efforts affect fit and finish, and vice versa.

Complicating the goal of balancing proper latch efforts with fit and finish is that appropriate adjustments are usually conducted on-line during vehicle assembly. It is difficult to control fit and finish in this environment because of the assembly process. This process usually involves attaching a steel support to the crosscar beam and then attaching the striker to a substrate portion of the support.. One half of a hinge is attached to the substrate, and the other half is attached to the glovebox door. Due to the stack up and between the different components, the fit and finish of the glovebox door with the instrument panel outer surface is hard to control. This also creates the previously described latch and striker effort issues. A squeak and rattle problem also exists due to the difficulty in controlling mating between the instrument panel and portions of the glovebox.

Thus, a glovebox assembly is needed which provides a latch with consistent, easily operable latch effort, which assists in controlling the fit and finish of the instrument panel, and which alleviates squeak and rattle problems.

SUMMARY OF THE INVENTION

The present invention overcomes the disadvantages of the related art by providing an instrument panel assembly for an automotive vehicle having a cross-car beam, the assembly providing connection between an instrument panel and a glovebox so that the glovebox has a separate mating reference between its moving parts independent of the instrument panel. The instrument panel is mounted to the cross-car beam and has a glovebox opening with a frame mating surface therearound. The glovebox has a frame and a door. The frame is attached adjacent the frame mating surface, and has a first integrally formed half-hinge. The door, which pivots to alternately cover and uncover the glovebox opening, has a second integrally formed half-hinge. The frame and the door are connected at the respective half-hinges to provide a mating reference therebetween independent of the instrument panel.

An advantage of the present invention is an instrument panel assembly with a modular glovebox mountable therein to minimize dimensional variations between the latch and the striker.

Another advantage is that off-line adjustments of the latch and the striker location for good opening and closing effort will not affect the fit and finish of the glovebox door to the instrument panel.

A similar advantage is that fit and finish adjustments between the modular glovebox and the instrument panel will not affect opening and closing effort of the glovebox door.

Still another advantage of the present invention is a modular glovebox which can be used with either a fixed bin or a swing bin design.

Yet another advantage of the present invention is that a frame portion of the modular glovebox assembly can serve as an energy management member.

Another advantage is a modular glovebox which is referenced to the cross-car beam instead of the instrument panel.

A feature of the present invention is a modular glovebox assembly having a frame portion with a first integral half-hinge connected to a second half-hinge integral with a glovebox door portion.

Another feature is a modular glovebox assembly with a frame portion which attaches to the vehicle cross-car beam over a frame surface of the instrument panel.

BRIEF DESCRIPTION OF THE DRAWINGS

These and other objects, advantages, and features of the present invention will be apparent to those skilled in the art upon reading the following description with reference to the accompanying drawings, in which:

FIG. 10 is a plan view of a glovebox frame and bolster assembly according to the present invention;

FIG. 11 is a cross-sectional view taken along line 11—11 of FIG. 10; and

FIG. 12 is an exploded perspective view of an alternative instrument panel assembly of the present invention.

DETAILED DESCRIPTION OF THE PREFERRED EMBODIMENT

Figure 1:
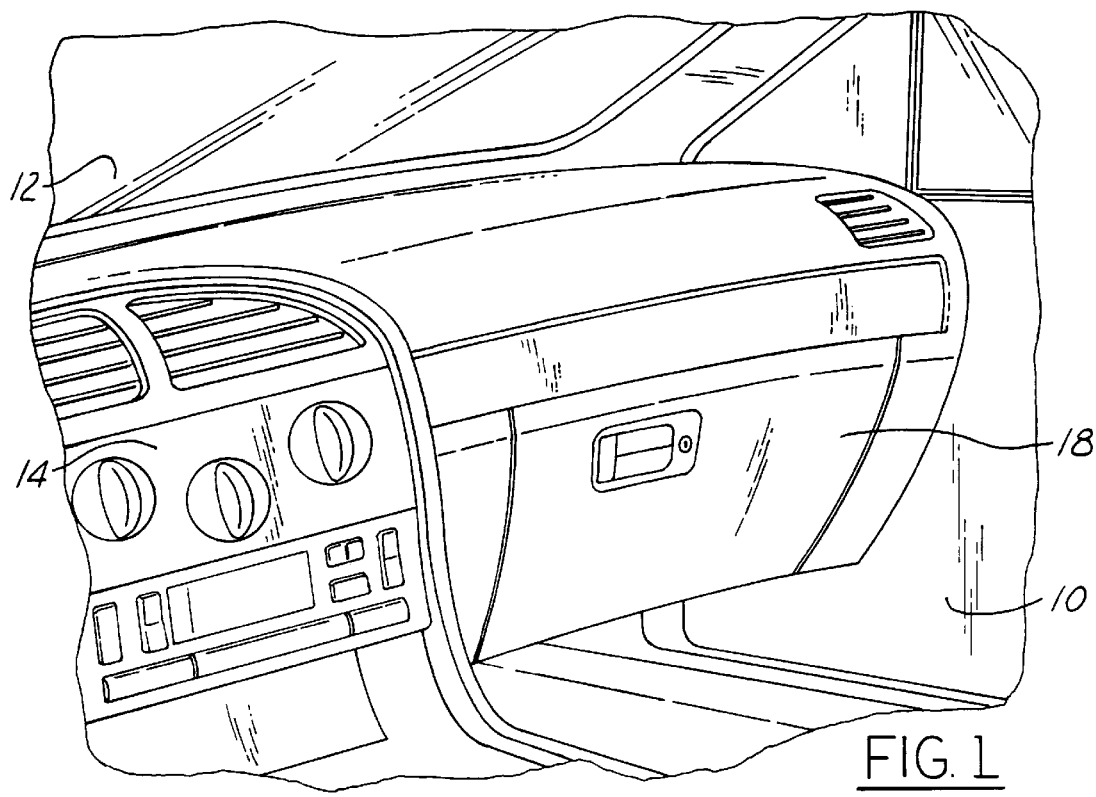
FIG. 1 is a perspective view of a vehicle passenger compartment showing an instrument panel assembly with a modular glovebox according to the present invention.
Figure 2:
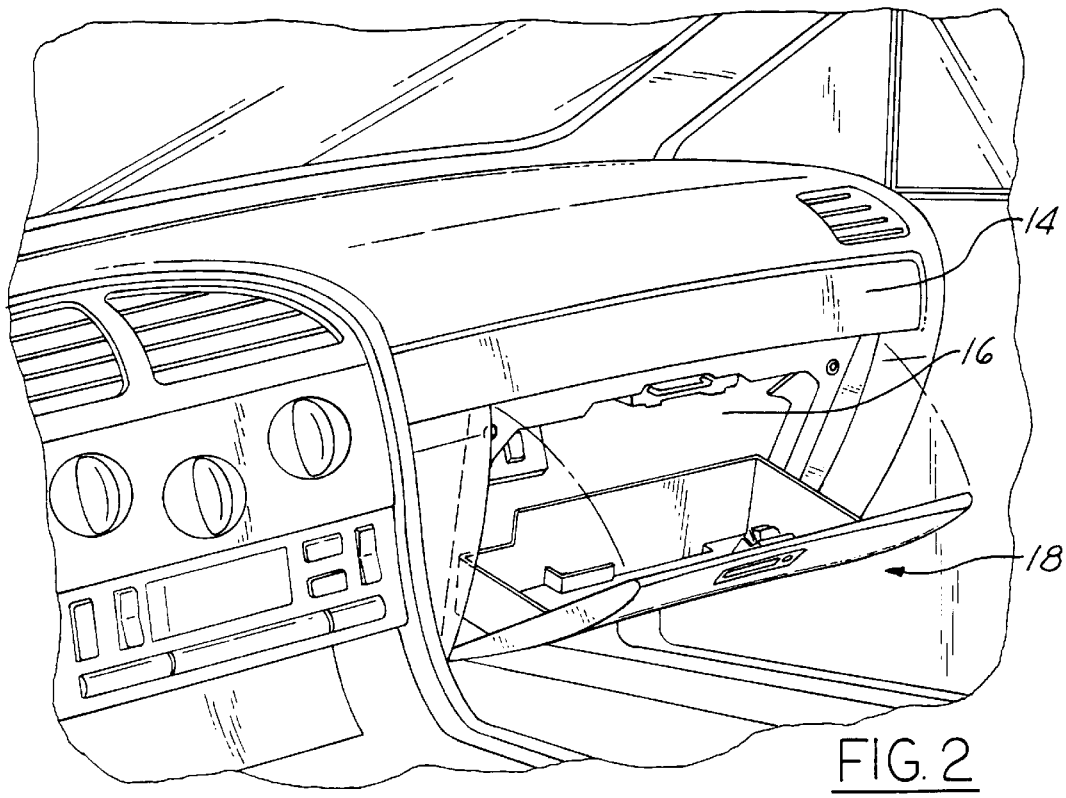
FIG. 2 is a perspective view similar to FIG. 1 but showing a modular glovebox door in an open position.
Figure 3:
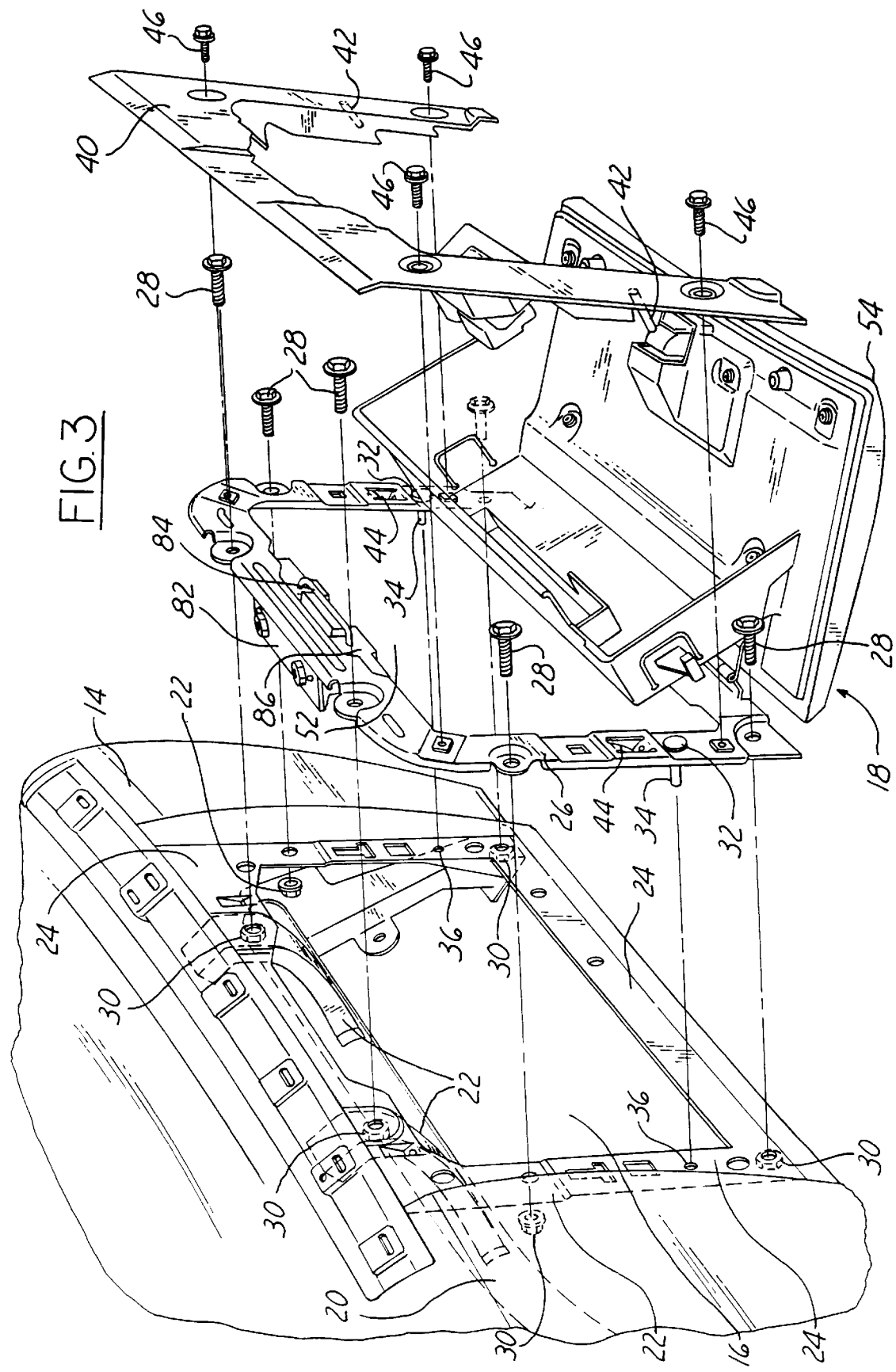
FIG. 3 is an exploded perspective view of the instrument panel assembly of the present invention.
Figure 4:
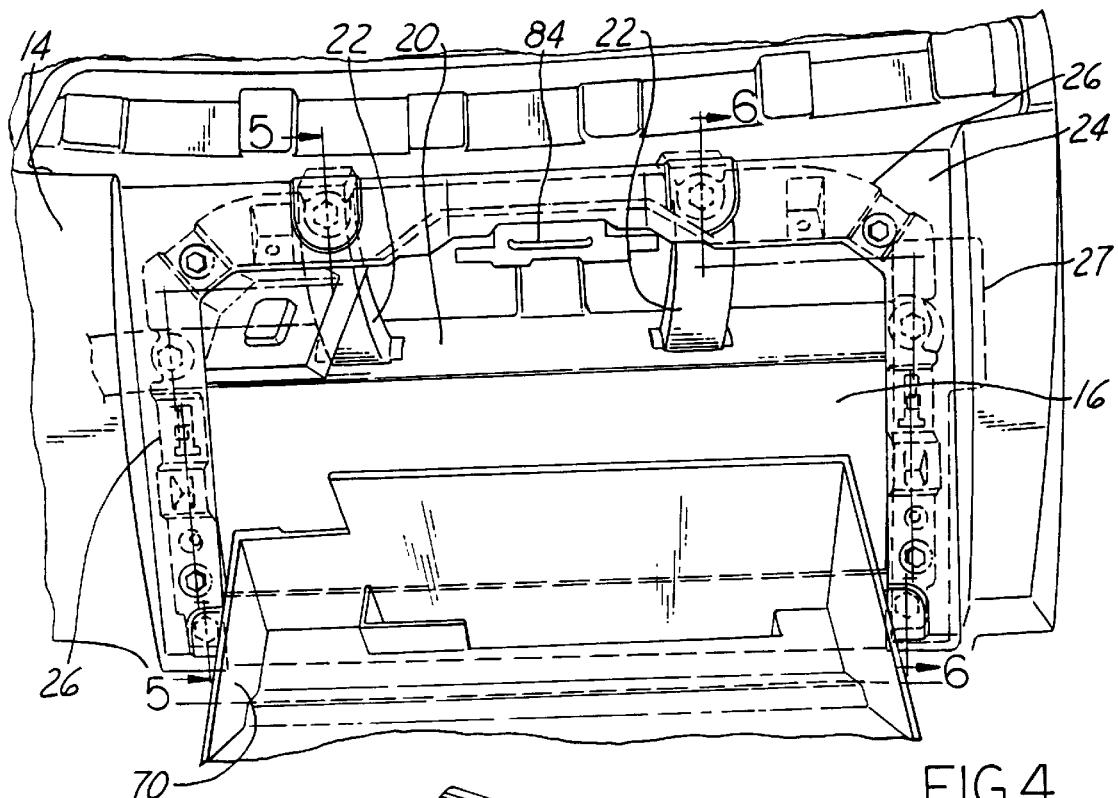
FIG. 4 is a front view of an instrument panel connected to a cross-car beam and having a glovebox opening with a glovebox movable thereinto.
Figure 5:
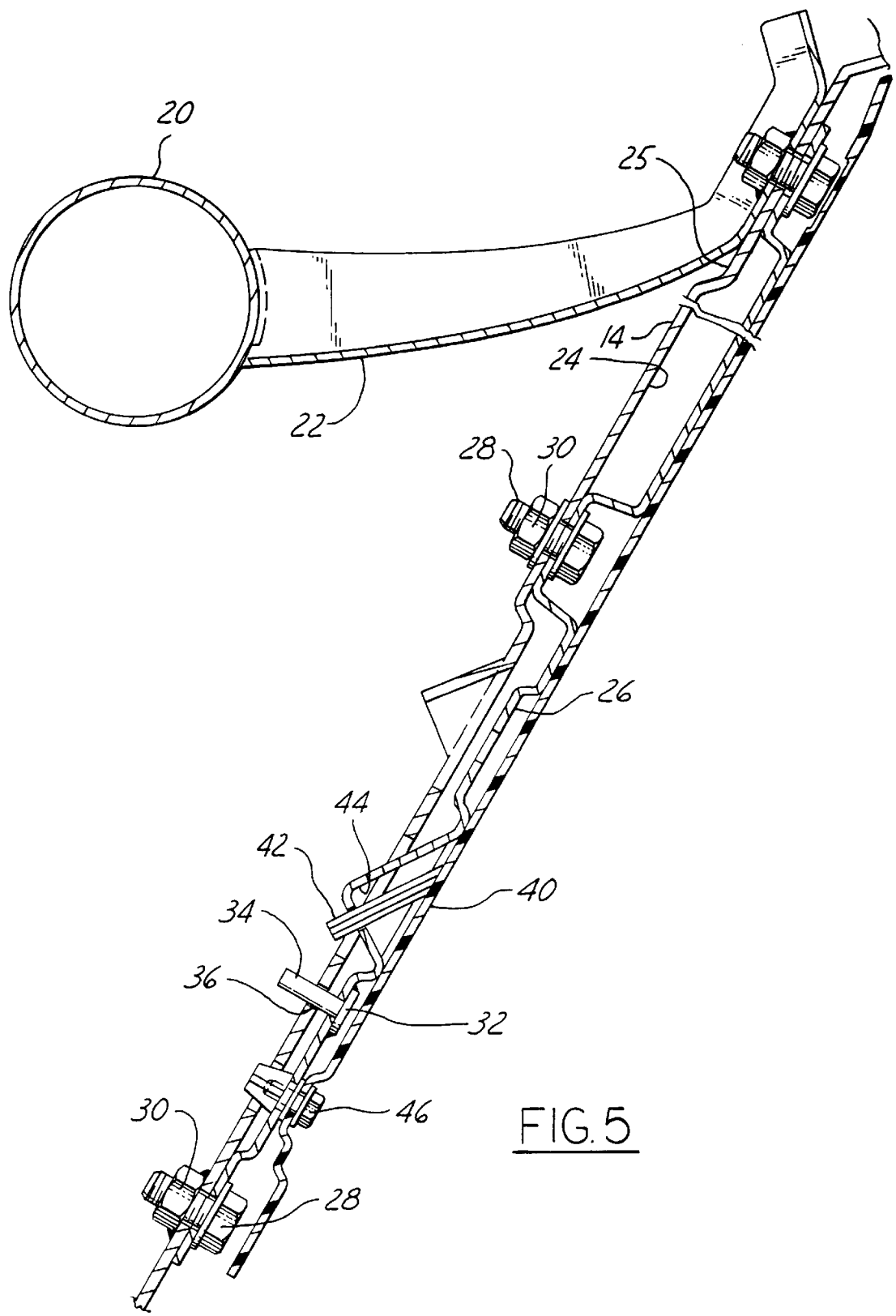
FIG. 5 is a cross-sectional view taken along line 5—5 of FIG. 4.
Figure 6:
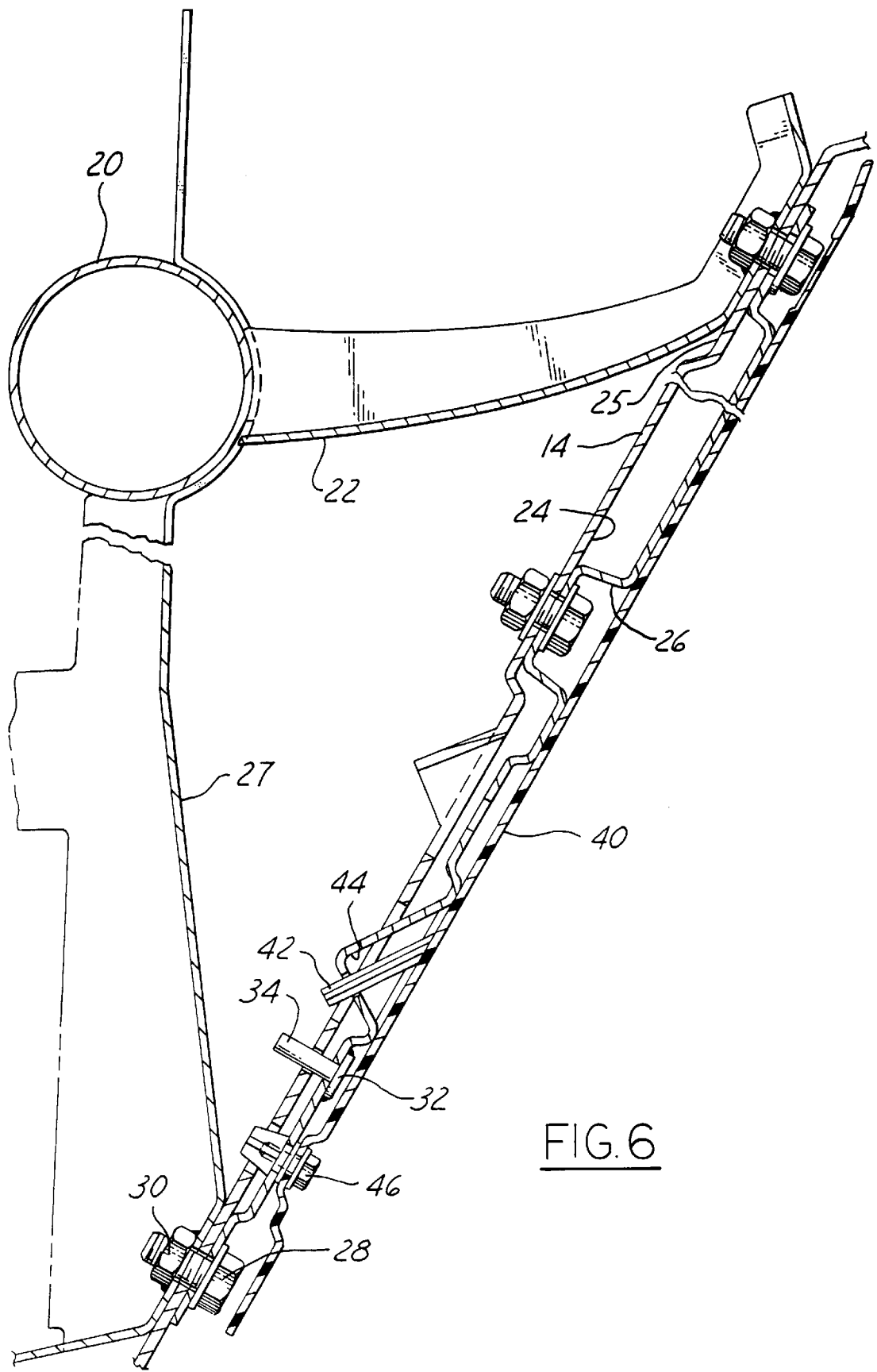
FIG. 6 is a cross-sectional view taken along line 6—6 of FIG. 4.

Turning now to the drawings, and in particular to FIG. 1 thereof, an interior passenger compartment 10 of an automotive vehicle 12 is shown having an instrument panel 14 which, as is typical in the industry, extends laterally across a forward portion of the vehicle 12. The instrument panel 14 includes an opening 16 into which a module glove box assembly, generally indicated at 18, is mounted (FIG. 2). As best seen in FIG. 3, the modular glovebox assembly 18 is attached through the instrument panel 14 to extensions 22 of a cross-car beam 20 (FIGS. 3-6). The instrument panel 14 is mounted to the cross-car beam 20 and has a frame mating surface 24 peripherally around the glove box opening 16 (FIGS. 3 and 4). Preferably, the extensions 22 extend from the cross-car beam 20 into juxtaposition with an opposite side 25 of the frame mating surface 24 of the instrument panel 14 (FIGS. 5 and 6). The modular glovebox assembly 18 has a frame portion 26 which attaches adjacent the frame mating surface 24 through the instrument panel 14 to the extensions 22 of the cross-car beam 20. The frame portion 26 can additionally be attached to a bracket 27 extending from the cross-car beam 20 (FIGS. 4 and 6) to provide additional support. Attachment of the frame portion 26 can be achieved with screws 28 to mating bolts 30 on the extensions 22 and bracket 27, or can be attached with other fasteners known to those skilled in the art, or in another fashion. To facilitate alignment of the frame portion 26 with respect to the extensions 22, a pair of alignment pins 32 have shafts 34 extending through the frame portion 26 and through holes 36 in the frame mating surface 24 (FIGS. 3, 5 and 6).

In a preferred embodiment, an applique 40 is mounted over the frame portion 26 to cover the attachments thereon and thus provide a more pleasing appearance when the glove box is in an open position. The applique 40 may have guide pins 42 which seat within guide receivers 44 in the frame portion 26 for properly aligning the applique 40 with respect to the frame portion 26 during assembly (FIGS. 3, 5 and 6). The applique 40 can then be attached, for example with decorative bolts 46, to the frame portion 26.

Figure 7:
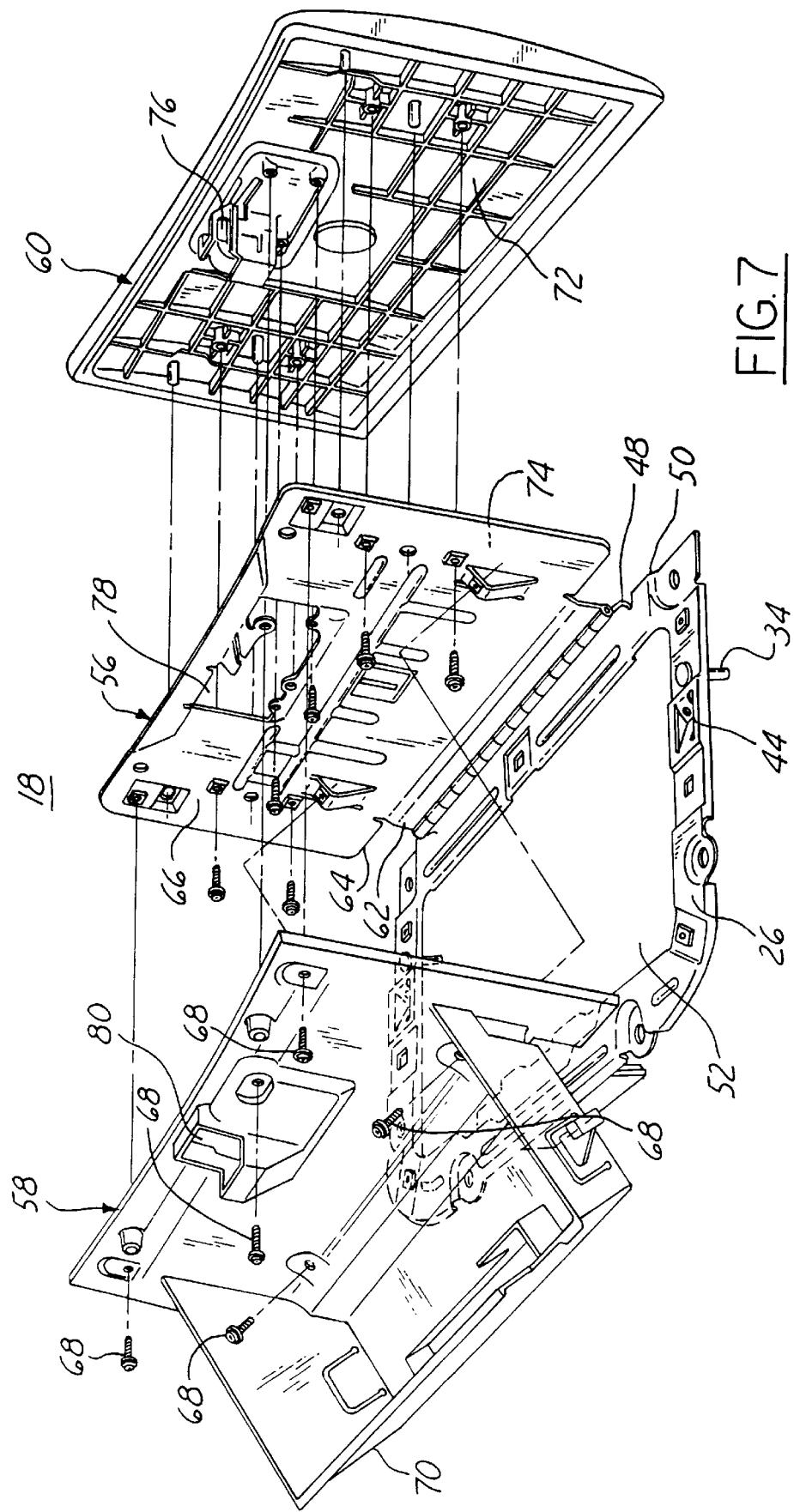
FIG. 7 is an exploded perspective view of a modular glovebox assembly according to the present invention.

Referring now to FIG. 7, a modular glove box assembly according to one aspect of the present invention is shown in exploded perspective view. The frame portion 26 has a frame half-hinge 48 formed along a frame hinge edge 50. A frame portion 26 is generally rectangular and has an aperture 52 therein which aligns with the opening 16 in the instrument panel 14, both receiving a storage bin therethrough. Those skilled in the art will recognize that the frame portion 26, and the aperture 52, need not be rectangular, but can take other shapes for meeting design requirements and ascetics.

Attached to the frame portion 26 is a door portion 54 (FIG. 3) for alternately covering and uncovering the opening 16 and the aperture 52. As best seen in FIG. 7, the door portion 54 has a generally planer bolster member 56, a bin plate 58, and a trim member 60. The bolster member 56 has a bolster half-hinge 62 integrally formed along a bolster hinge edge 64. The frame portion 26 and the bolster member 56 are connected at there respective half-hinges 48, 62, to provide a mating reference between the door portion 54 and the frame portion 26 independent of the instrument panel 14. That is, the half-hinges are not connected to the instrument panel 14, as is done in conventional practice, and thus tolerance buildup inherent in separate hinge half attachment to the instrument panel which result in inconsistent latch and striker efforts, and fit and finish problems, are significantly reduced with the present invention. In addition, as is further discussed below, a modular glove box assembly according to the present invention advantageously permits testing for proper latch efforts, and fit and finish, off-line, that is, prior to insulation into a vehicle on the assembly line.

Still referring to FIG. 7, the bin plate 58 is attached to an inner, opening facing surface 66 of the bolster member 56, for example, with screws 68. In a preferred embodiment, the bin plate 58 has a bin member 70 integrally formed therewith for movement through the aperture 52. The bin member 70 can take a variety of shapes to meet design requirements and space limitations.

The trim member 60 is attached on a bolster facing side 72 thereof to an outer side 74 of the bolster member 56 (FIG. 7). As seen in FIG. 7, the outer side 74 of the bolster member 56 is opposite the inner, opening facing surface 66. On the bolster facing side 72 of the trim member 60 is attached latched member 76 which projects through a latch opening 78 in the bolster member 56 and through a bin opening 80 in the bin plate 58 (FIGS. 3 and 7).

Figure 8:
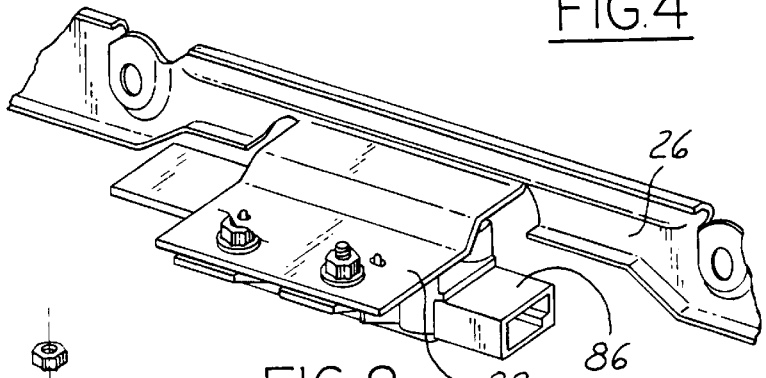
FIG. 8 is a rear perspective view of a striker assembly shown attached to a frame portion of a modular glovebox assembly according to the present invention.
Figure 9:
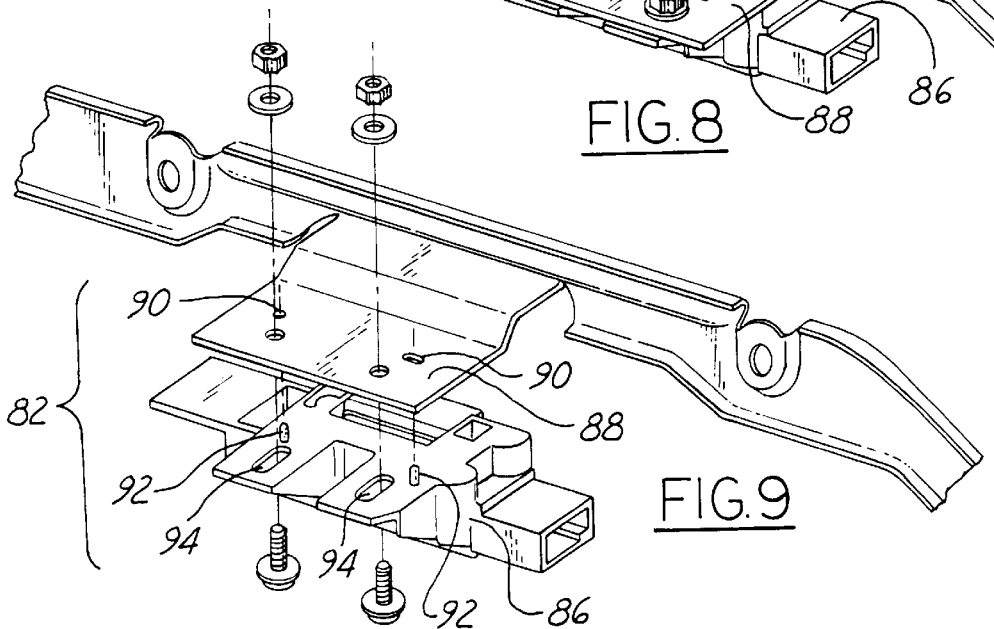
FIG. 9 is an exploded rear perspective view of the striker assembly of FIG. 8.

Attached to the frame portion 26 is a striker assembly 82 (FIG. 3) for latching cooperation with the latch member 76 when the door portion 54 is moved to a closed position covering the aperture 52 and the opening 16. The striker assembly 82 has a striker member 84, or striker bar, which latches to the latch member 76 in a known fashion. The striker assembly 82 has a support member 86, to which the striker member 84 is attached. In a preferred embodiment, the striker assembly 82 is mounted to a flange 88 extending generally perpendicular from a plane formed by the frame portion 26 (FIGS. 3, 8 and 9). The flange 88 has a pair of guide holes 90 which receive striker alignment pins 92 therein to assist with striker member adjustment during assembly of the modular glove box assembly 18. One of the guide holes 90 is preferably elongated, or oval shaped, to allow for tolerance variation. The support member 86 also has a pair of attachment holes 94, preferably oval shaped or elongated in a direction perpendicular to the plane of the aperture 52 of the frame portion 26 (FIG. 9). Such an arrangement allows the striker support member 86 to be adjusted toward or away from the frame portion 26 to achieve proper latch closing and opening efforts. Since the frame portion 26 is attached to the door portion 54 as part of the modular glove box assembly 18, the striker member 84 adjustments can be made before the modular glove box assembly 18 is installed in the vehicle. Therefore, the advantageous arrangement of the present invention permits off-line assembly and testing of the glove box before installation, thereby increasing overall vehicle assembly efficiency and providing more consistent and desirable latch closing and opening efforts.

The aforementioned advantage of testing and adjusting the modular glove box assembly 18 off-line is made possible, in part, by the bolster member 56 attachment to the frame portion 26, as seen in FIGS. 10 and 11. Each has a half-hinge 48, 62, respectively, integrated thereinto thus eliminating potential tolerance stack-up which may result with use of a conventional piano hinge, which would require separate half-hinges connected to each piece.

In a second embodiment of the present invention, the instrument panel assembly includes a device, such as a CD player 100, mounted within the storage space 102 defined by the instrument panel 14 (FIG. 12). The frame portion 26 is attached to the glove box door assembly 54, as described above, and the frame portion 26 is attached to the frame mating surface 24, also as described above. In order to accommodate the CD player 100, an alternate applique 140 is mounted over the frame portion 26. The applique 140 has a CD casing 142 which encloses the CD player 100, except for a window portion 144 which permits insertion of CDs and access to a CD control panel 104. In addition, the CD casing 142 is opened at a rear section (not shown) to permit the casting to slide over the CD player 100. The applique 140 preferably has a storage bin 146 integrally molded therewith at a location with respect to the CD casing 140 so as to best utilize the storage space 102 (FIG. 12). Those skilled in the art will recognize that a fixed bin may also be mounted within the storage space 102, or a storage bin may be attached to an inner surface of the glove box door assembly 54, as is shown in FIG. 3. The applique 140 has an access opening 148 through which a utility cover 150, mounted to the glovebox door assembly 54, may move when the glovebox door is rotated to a closed position. The cover 150 may serve to enclose and provide a more pleasing appearance for a device (not shown) mounted next to the CD player 100, for example, a trunk lid release button.

Although the preferred embodiment of the present invention has been disclosed, various changes and modifications may be made without departing from the scope of the invention as set forth in the appended claims.

We claim:

1. An instrument panel assembly for an automotive vehicle having a cross-car beam attached laterally between opposite sides of a forward portion of the vehicle, the assembly comprising:
   an instrument panel mounted to the cross-car beam and having a storage space therein accessible through a glovebox opening with a frame mating surface therearound;
   a modular glovebox having:
      a frame portion attached adjacent the frame mating surface through the instrument panel to the cross-car beam and having a first integrally formed half-hinge;
      a door portion for alternately covering and uncovering the opening, the door portion having a second integrally formed half-hinge; and
      the frame portion and the door portion connected at the respective half-hinges to provide a mating reference therebetween independent of the instrument panel; and
   an appliqué attached over the frame member and having a storage bin integral therewith.

2. An instrument panel assembly according to claim 1 wherein the frame portion is attached to at least one extension from the cross-car beam.

3. An instrument panel assembly according to claim 1 wherein the door portion has a storage bin attached thereto for movement through the glovebox opening and into the storage space with when the door portion is moved from an open position uncovering the opening to a closed position covering the opening.

4. An instrument panel assembly according to claim 1 wherein the appliqué has a casing integral therewith for encasing a device mounted in the storage space.

5. An instrument panel assembly according to claim 1 wherein a striker member is attached to the frame portion.

6. An instrument panel assembly according to claim 5 wherein a latch member is attached to the door portion for latching to the striker member.

7. An instrument panel assembly for an automotive vehicle having a cross-car beam attached laterally between opposite side of a forward portion of the vehicle, the assembly comprising:
   an instrument panel mounted to the cross-car beam and having a storage space therein accessible through a glovebox opening with a frame mating surface therearound;
   a modular glovebox having;
      a frame portion attached adjacent the frame mating surface through the instrument panel to the cross-car beam and having a first integrally formed half-hinge;
      a door portion for alternately covering and uncovering the opening, the door portion having a second integrally formed half-hinge; and
      the frame portion and the door portion connected at the respective half-hinges to provide a mating reference therebetween independent of the instrument panel;
   a device mounted in the storage space; and
   an appliqué attached over the frame member and having a storage bin integral therewith and a casing integral therewith for encasing the device.

8. An instrument panel assembly according to claim 7 wherein the device is a CD player.

9. An instrument panel assembly according to claim 8 wherein the casing has a window allowing access to a panel of the CD player.

* * * * *